(12) United States Patent
Larsen et al.

(10) Patent No.: US 11,231,014 B2
(45) Date of Patent: Jan. 25, 2022

(54) SYSTEM AND METHOD FOR REDUCING VOLTAGE DISTORTION FROM AN INVERTER-BASED RESOURCE

(71) Applicant: General Electric Company, Schenectady, NY (US)

(72) Inventors: Einar Vaughn Larsen, Ballston Lake, NY (US); Dustin Howard, Atlanta, GA (US); Min Naing Lwin, Austin, TX (US); Ignacio Vieto Miranda, Troy, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/907,910

(22) Filed: Jun. 22, 2020

(65) Prior Publication Data

US 2021/0396212 A1 Dec. 23, 2021

(51) Int. Cl.
*F03D 9/25* (2016.01)
*H02J 3/18* (2006.01)
*H02P 9/02* (2006.01)

(52) U.S. Cl.
CPC ............... *F03D 9/257* (2017.02); *H02J 3/18* (2013.01); *H02P 9/02* (2013.01); *H02J 2300/28* (2020.01)

(58) Field of Classification Search
CPC ......... F03D 9/257; H02J 3/18; H02J 2300/28; H02P 9/02
See application file for complete search history.

(56) References Cited

U.S. PATENT DOCUMENTS

| 6,681,190 B2 | 1/2004 | Ulrich |
| 6,950,322 B2 | 9/2005 | Ferens |

(Continued)

FOREIGN PATENT DOCUMENTS

| CN | 102664413 A | 9/2012 |
| CN | 108471263 B | 9/2019 |

(Continued)

OTHER PUBLICATIONS

De Oliveira et al., Wind Energy Conversion System Based on DFIG With Three-Phase Series Active Filter Operating with Floating Capacitors, 2018 IEEE Energy Conversion Congress and Exposition (ECCE), pp. 5500-5507.

(Continued)

*Primary Examiner* — Joseph Ortega
(74) *Attorney, Agent, or Firm* — Dority & Manning, P.A.

(57) ABSTRACT

A method for operating a inverter-based resource connected to a power grid includes receiving one or more voltage feedback signals created by at least one component of the inverter-based resource, wherein distortion components of the one or more voltage feedback signals are more sensitive to voltage distortion created by the inverter-based resource than by external sources of voltage distortion. Further, the method includes extracting a distortion component of the one or more feedback signals having a certain phase sequence and frequency. Moreover, the method includes determining a voltage command for the power converter as a function of, at least, the distortion component. Thus, the method includes controlling the power converter based on the voltage command such that the voltage distortion created by the at least one component of the inverter-based resource is reduced in a manner that is relatively insensitive to voltage distortion created by sources external to the inverter-based resource.

19 Claims, 11 Drawing Sheets

(56) References Cited

U.S. PATENT DOCUMENTS

| | | | |
|---|---|---|---|
| 7,485,987 | B2 | 2/2009 | Mori et al. |
| 7,904,495 | B2 | 3/2011 | Ramos et al. |
| 8,471,514 | B2 | 6/2013 | Zargari et al. |
| 8,742,734 | B2 | 6/2014 | Martin et al. |
| 8,773,873 | B2 | 7/2014 | Wagoner et al. |
| 9,214,886 | B2 | 12/2015 | Suzuki |
| 9,231,481 | B2 | 1/2016 | Wallis |
| 9,270,194 | B2 | 2/2016 | Brogan et al. |
| 9,407,133 | B1 | 8/2016 | Alexander |
| 9,722,427 | B2 | 8/2017 | Ma et al. |
| 9,806,598 | B2 | 10/2017 | Franchino |
| 9,837,943 | B2 | 12/2017 | Oriol et al. |
| 9,887,616 | B2 | 2/2018 | Bai et al. |
| 10,128,742 | B2 | 11/2018 | Krumpholz |
| 10,431,984 | B2 | 10/2019 | Mouni et al. |
| 10,511,220 | B2 | 12/2019 | Kawashima |
| 10,532,765 | B2 | 1/2020 | Kano et al. |
| 2016/0065105 | A1* | 3/2016 | Hardwicke, Jr. ......... F03D 7/04 290/44 |
| 2016/0285390 | A1 | 9/2016 | Rodriguez |
| 2018/0152095 | A1 | 5/2018 | Bai et al. |
| 2019/0312502 | A1 | 10/2019 | Ganireddy et al. |

FOREIGN PATENT DOCUMENTS

| | | |
|---|---|---|
| DE | 102011083753 A1 | 4/2012 |
| EP | 2436092 B1 | 7/2013 |
| EP | 2750270 A1 | 7/2014 |
| EP | 3282538 A1 | 2/2018 |
| EP | 2460244 B1 | 5/2018 |
| EP | 3317955 A1 | 5/2018 |
| EP | 2487780 B1 | 12/2019 |
| JP | 2000050634 A | 2/2000 |
| JP | 2014050150 A | 3/2014 |
| JP | 2015192593 A | 11/2015 |
| JP | 2017139945 A | 8/2017 |
| JP | 2017147840 A | 8/2017 |
| JP | 6637507 B2 | 1/2020 |

OTHER PUBLICATIONS

Manias, Power Electronics and Motor Drive Systems, Science Direct, 11.5 thru 11.5.5, ISBN 978-0-12-811798-9, 2017, pp. 826-842.

Peng et al., A New Approach to Harmonic Compensation in Power Systems—A Combined System of Shunt Passive and Series Active Filters, IEEE Transactions on Industry Applications, vol. 26, No. 6, Nov./Dec. 1990, pp. 983-990.

Wang et al., A Series Active Power Filter Adopting Hybrid Control Approach, IEEE Transactions on Power Electronics, vol. 16, No. 3, May 2001, pp. 301-310.

Yao et al., Enhanced Control of a DFIG-Based Wind-Power Generation System with Series Grid-Side Converter Under Unbalanced Voltage Conditions, IEEE Transactions on Power Electronics, vol. 28, No. 7, Jul. 2013, pp. 3167-3181.

European Search Report for EP Application No. 21179027,4:, dated, Nov. 16, 2021.

* cited by examiner

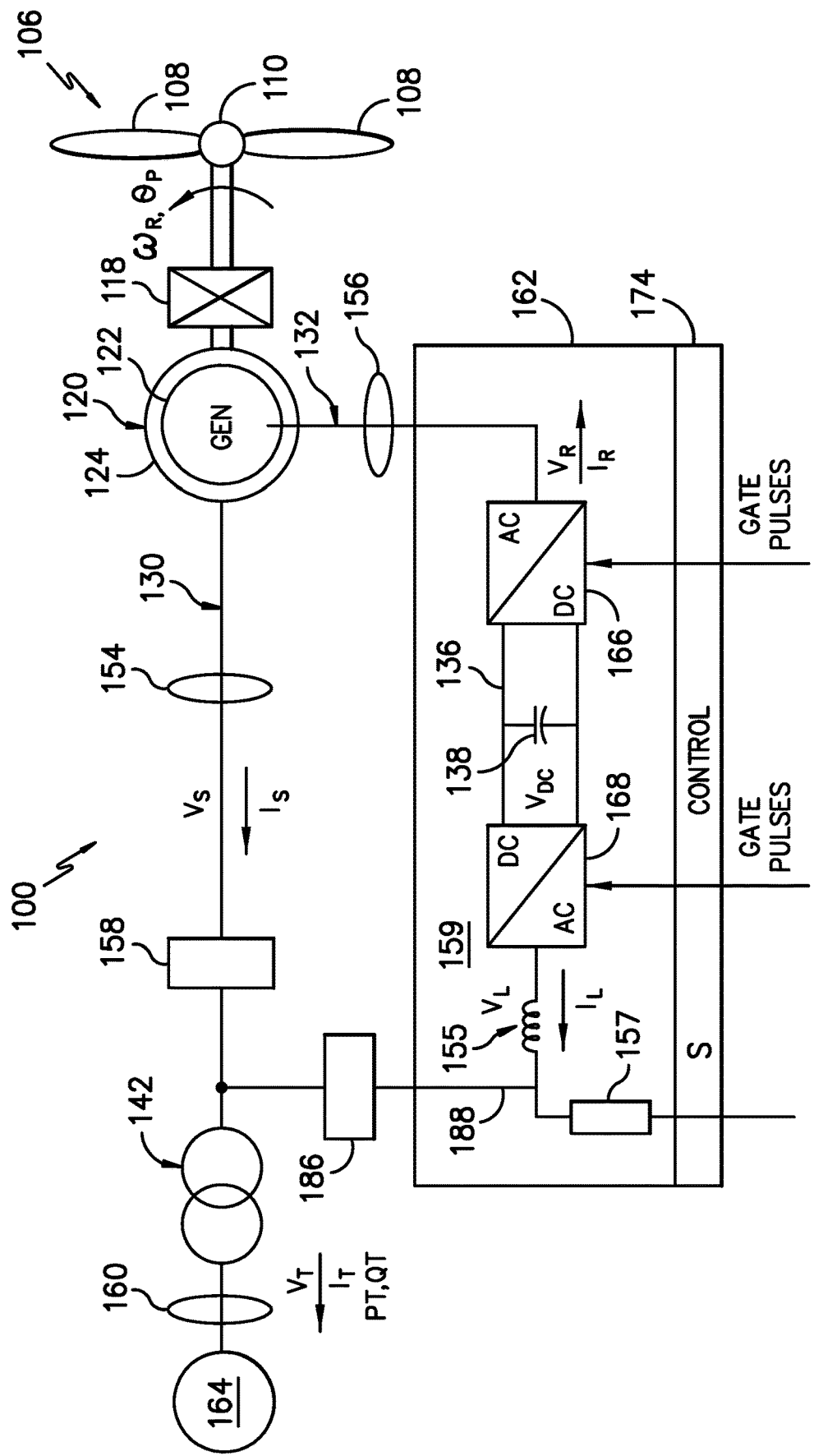
FIG. -1-

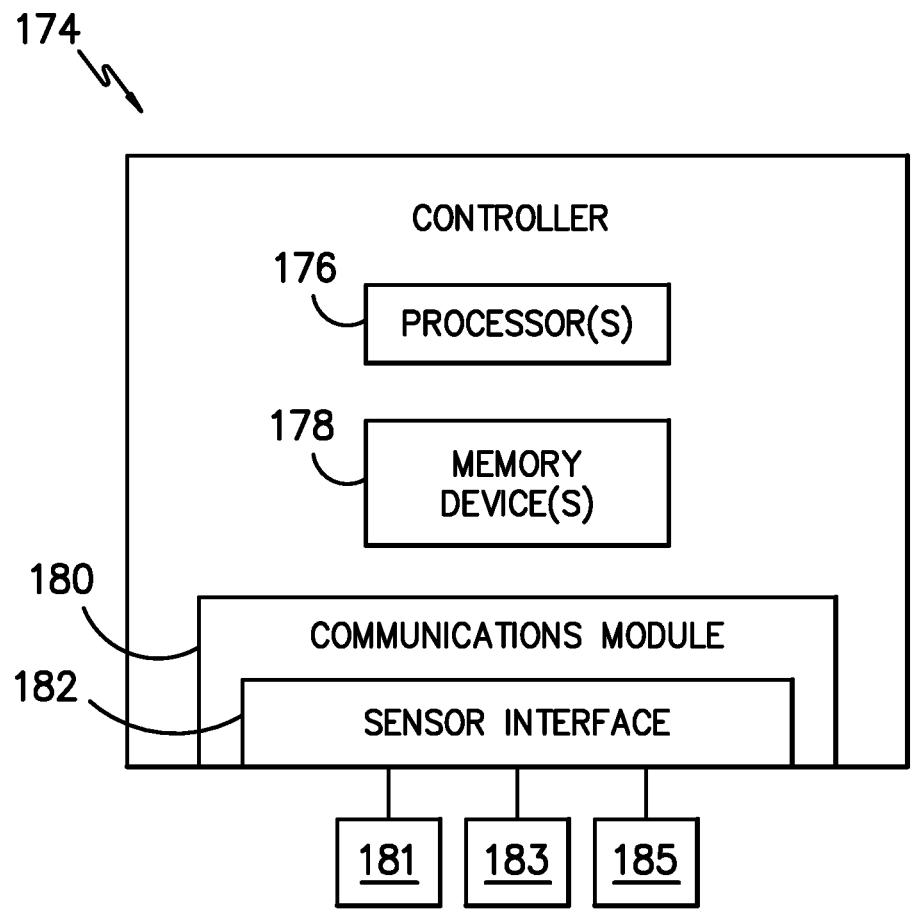
FIG. -2-

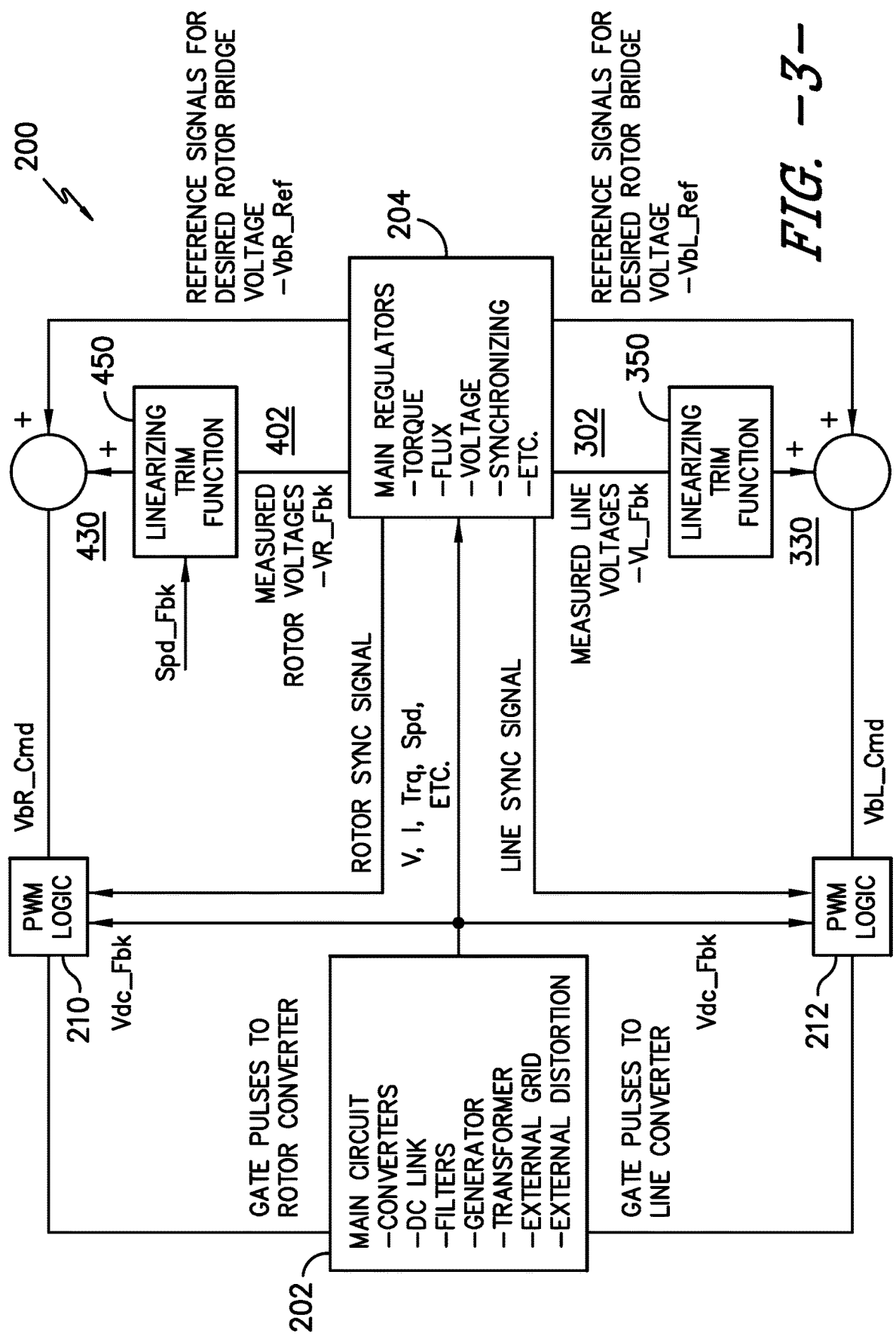
FIG. -3-

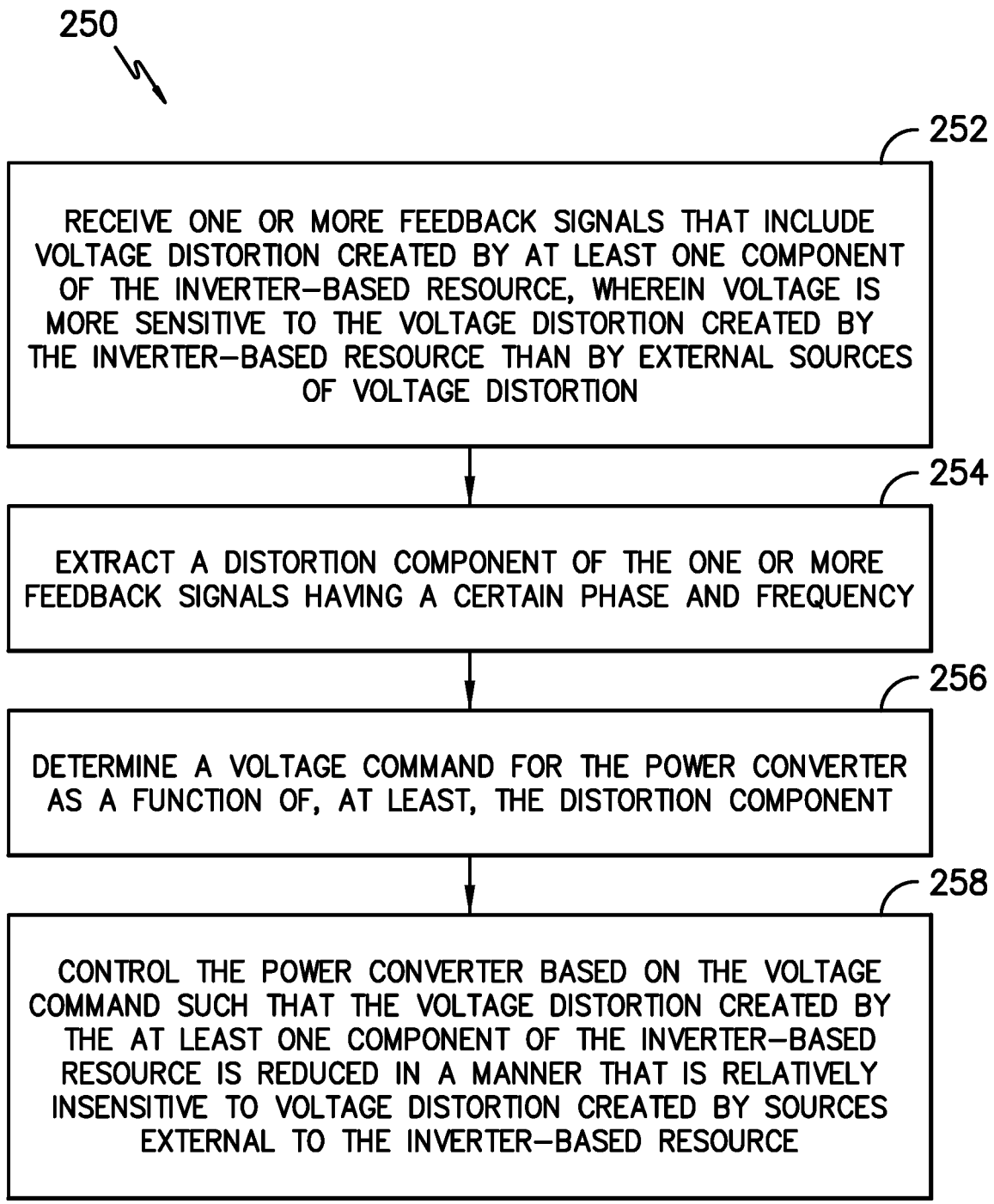
FIG. -4-

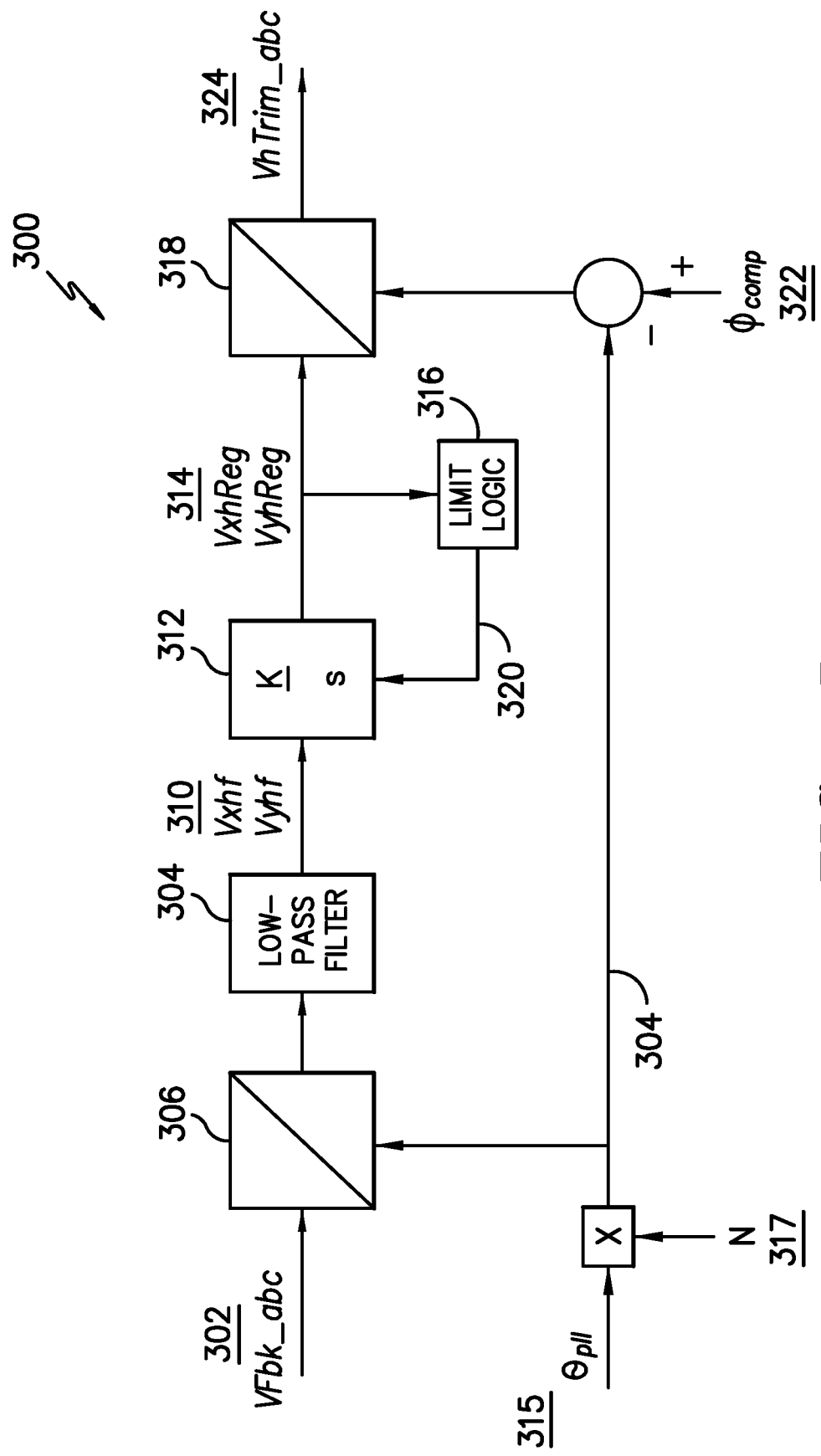
FIG. -5-

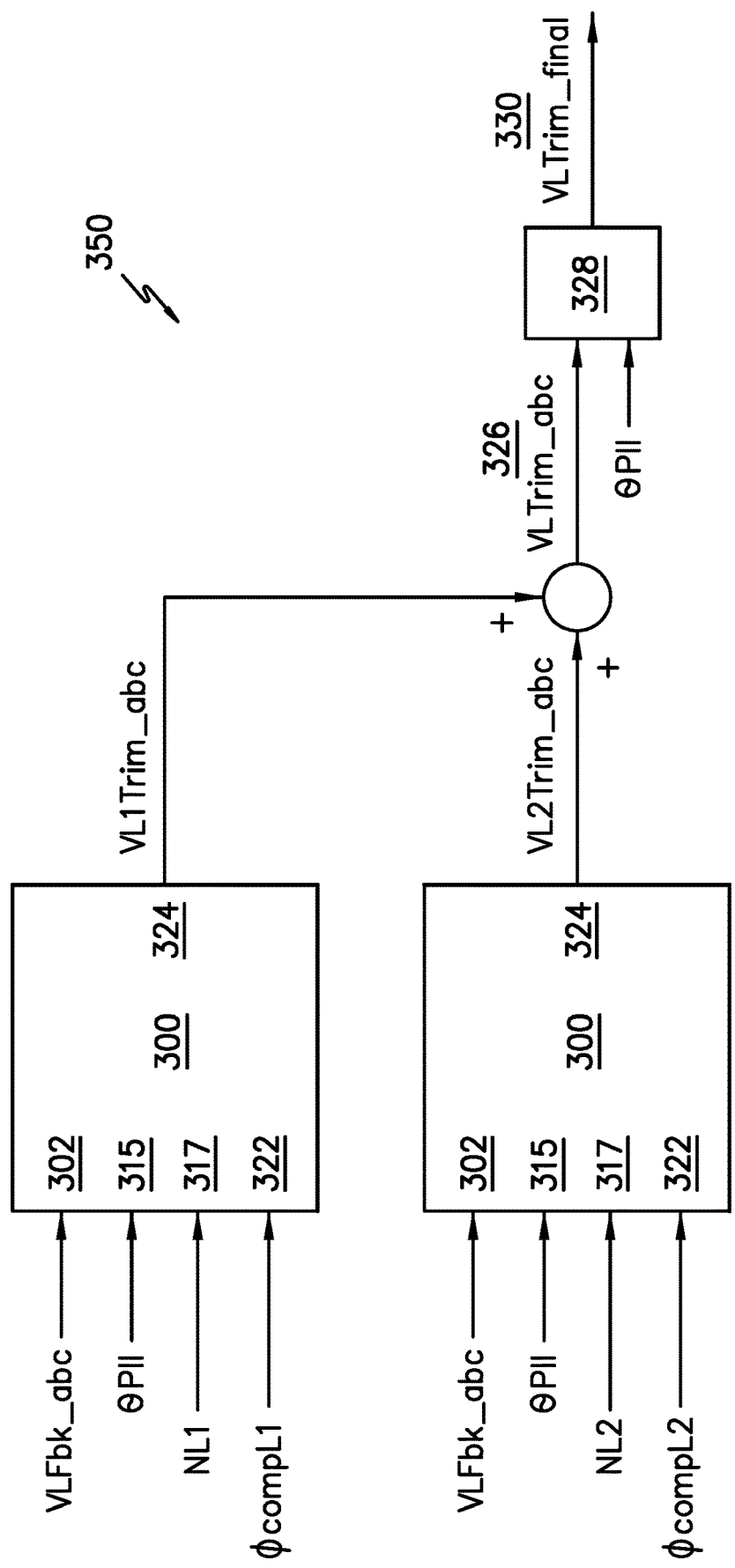
FIG. -6-

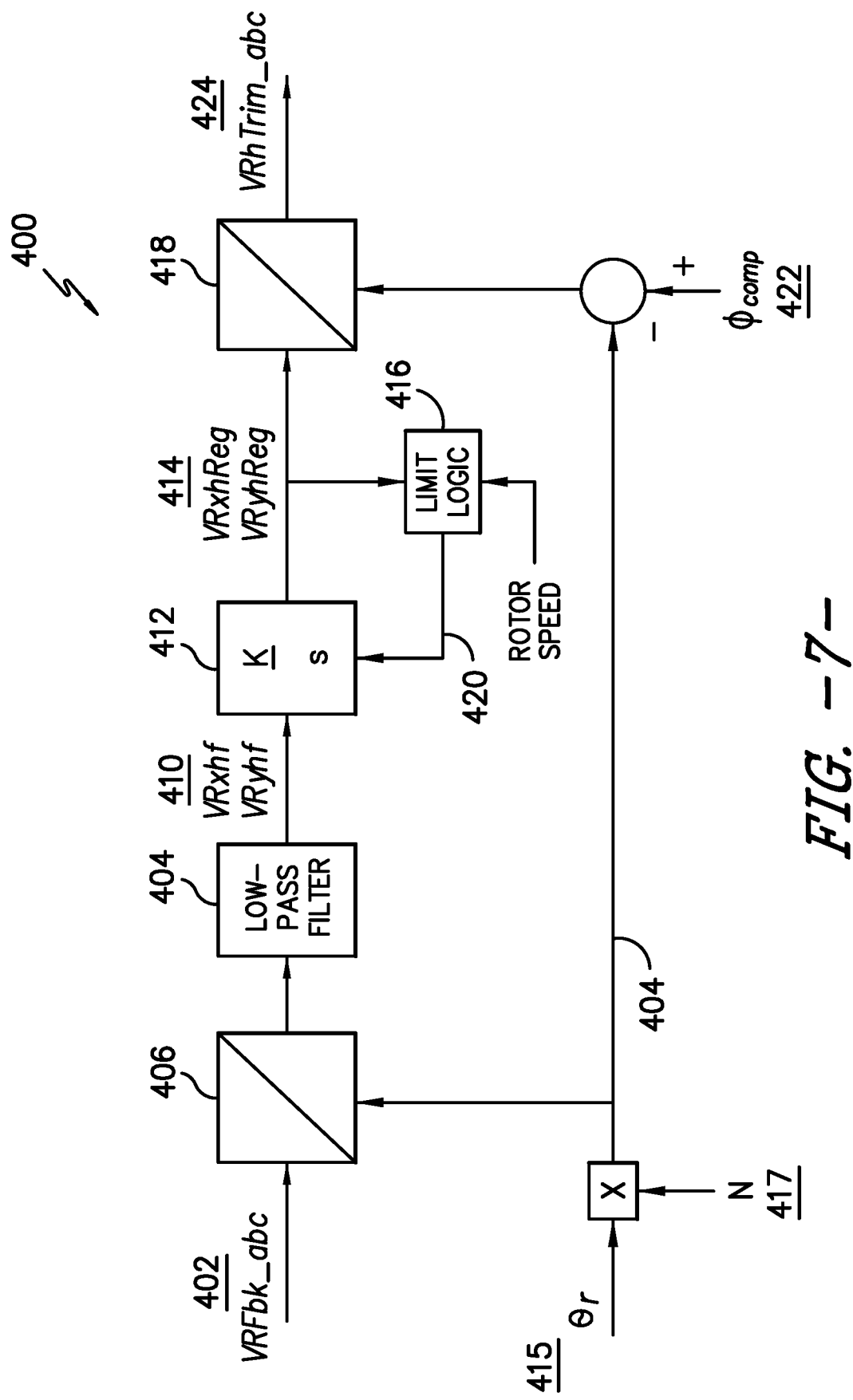
FIG. -7-

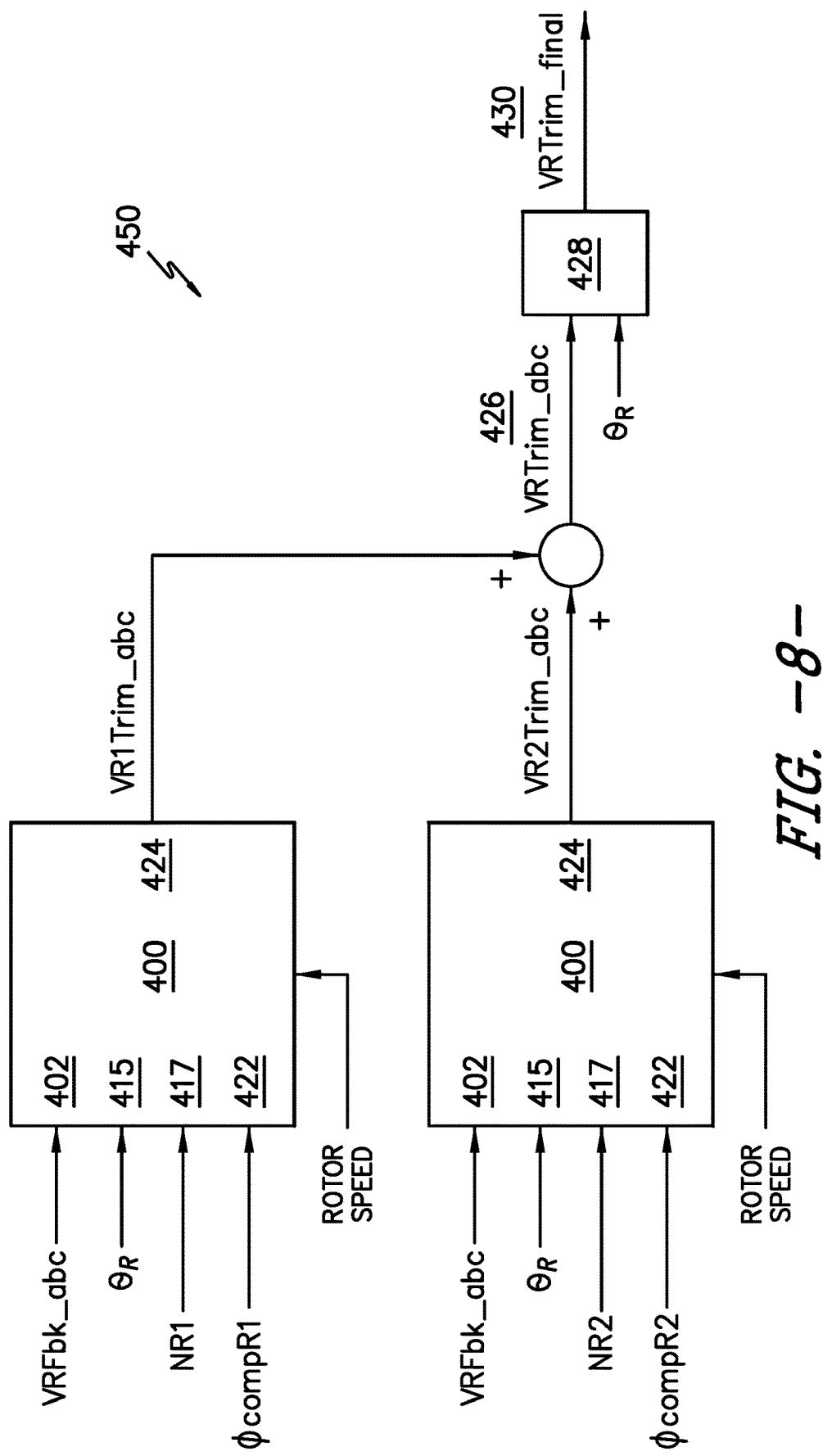
FIG. -8-

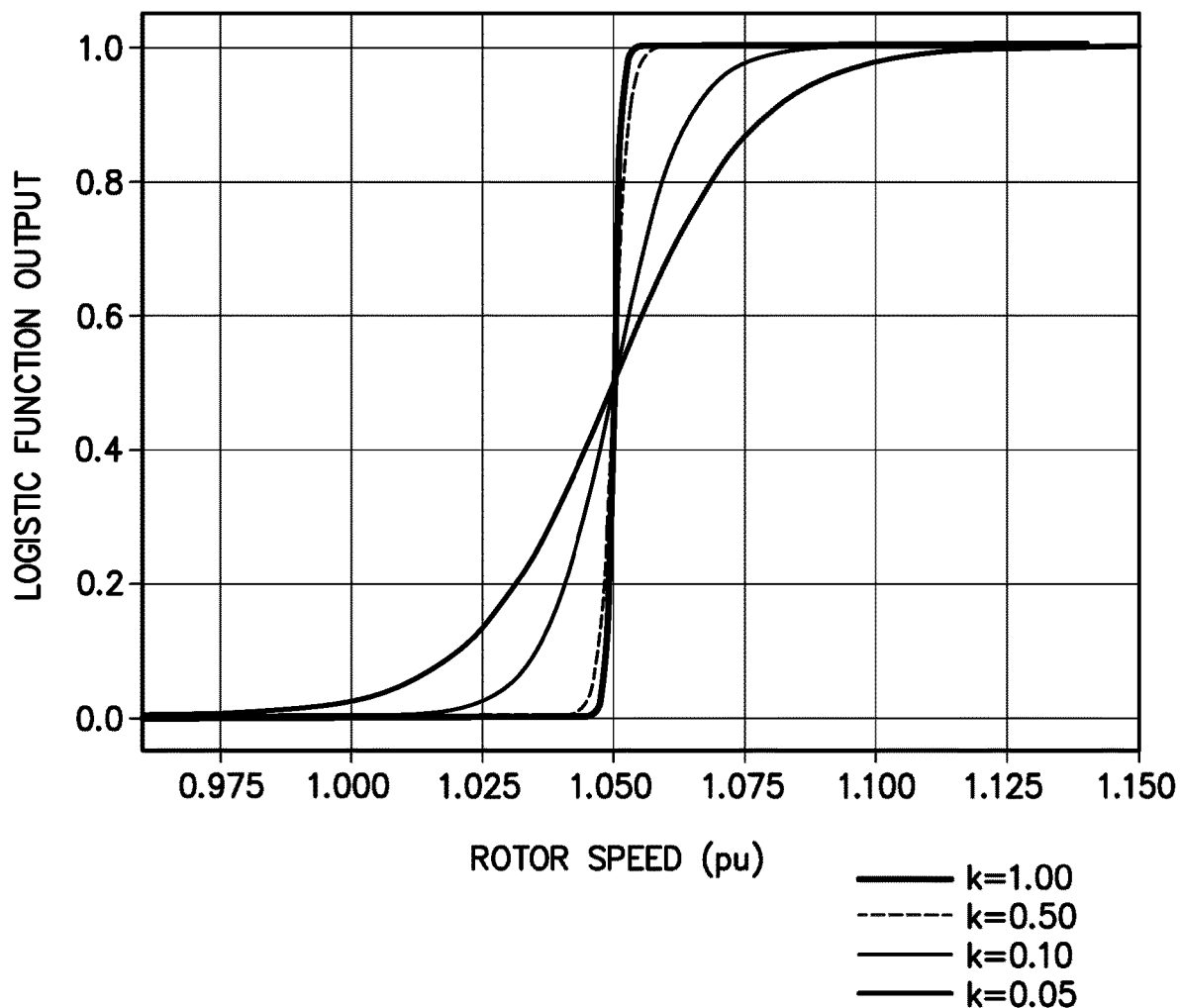
FIG. -9-

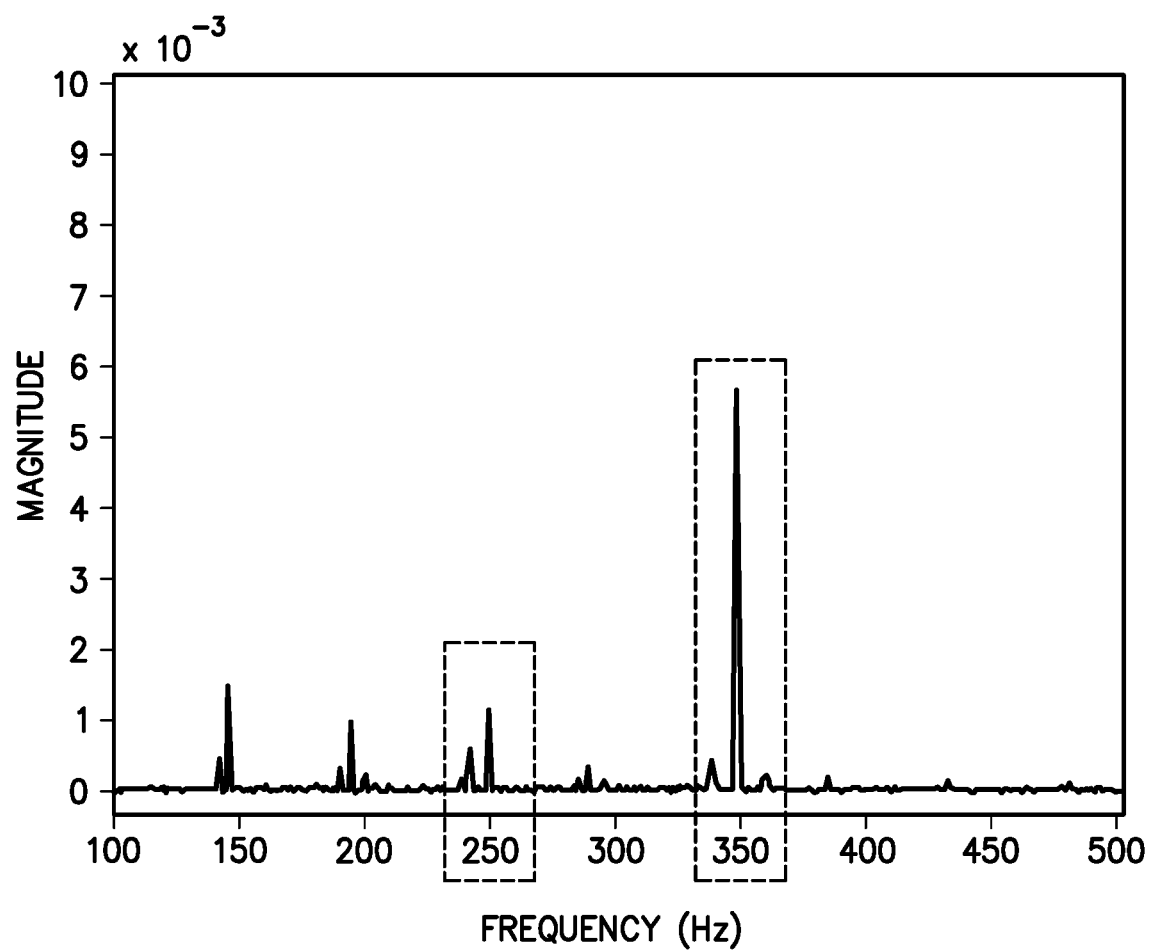
FIG. -10-

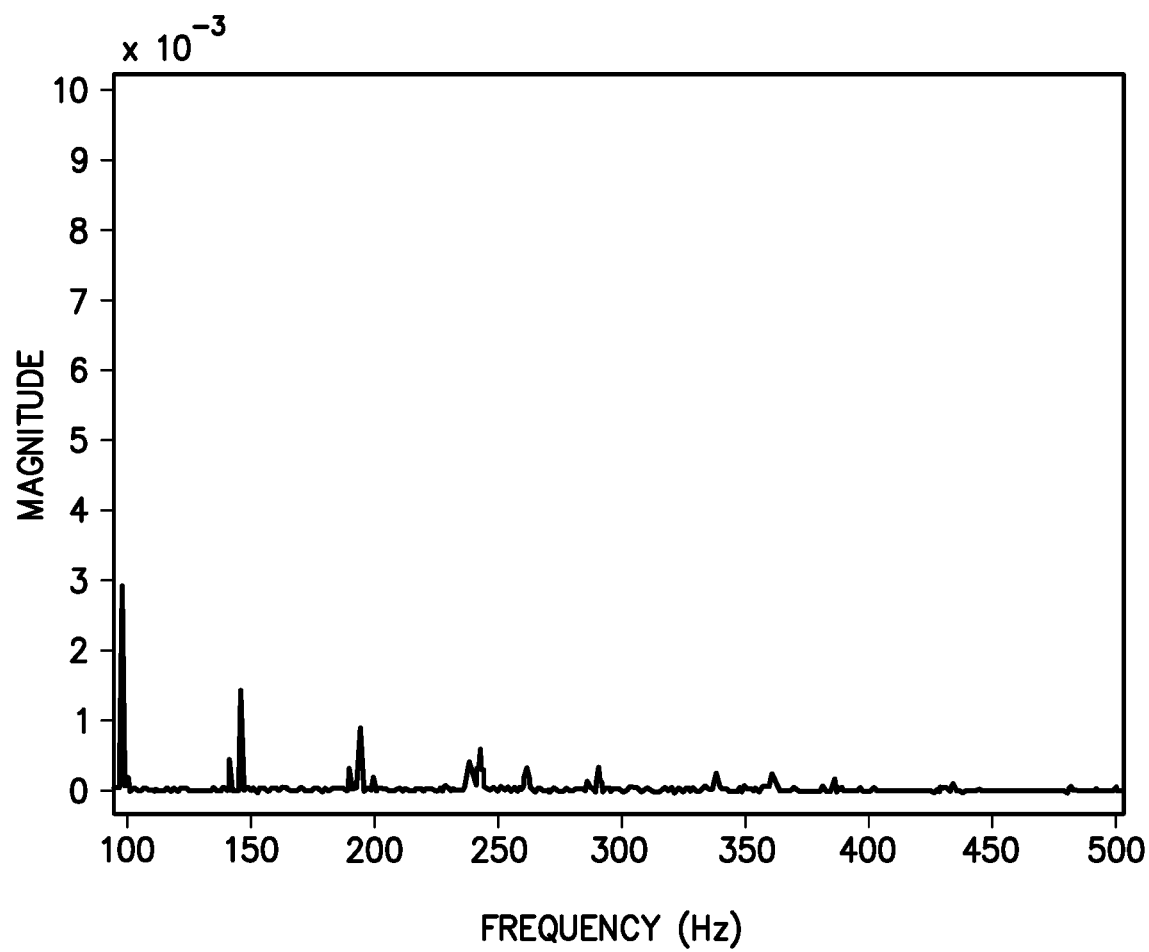
FIG. -11-

SYSTEM AND METHOD FOR REDUCING VOLTAGE DISTORTION FROM AN INVERTER-BASED RESOURCE

FIELD

The present disclosure relates generally to inverter-based resources, and more particularly to a system and method for reducing voltage distortion created by an inverter-based resource.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven dual-fed asynchronous generator (DFAG) systems or full power conversion systems, may include a power converter with an AC-DC-AC topology. In such system, the generator stator is separately connected to the power grid via a main transformer. Moreover, the DFAG may be a variable speed machine.

In certain instances, however, such systems can generate voltage distortion that need to be controlled and/or reduced. The primary sources of such voltage distortion in DFAG-based wind turbine systems may be the rotor-side and the line-side converters and the generator stator. More specifically, the line-side converter generates distortions seen on the grid as integer multiples of grid frequency, whereas the rotor-side converter generates distortions seen on the grid as variable frequency associated with rotor speed. Further, slotting effects of the generator stator are seen on the grid as integer multiples of grid frequency, which is generally the same for all electric machines. External background distortion always exists, which is created by all other devices connected to grid. At their point of origin, all such distortions manifest as primarily voltage-source characteristics with small internal impedance. Typically, the fifth ($5^{th}$) and seventh ($7^{th}$) frequency components are of practical concern, but other frequencies may also be of concern in certain applications.

The resultant distortion components of current flowing via connection with the grid is the sum of the distortion produced by the wind turbine components and the background distortion. For conventional systems, an external filter is provided to reduce such distortions. The external equipment can be active or passive filter types. Passive filters are generally avoided due to cost and the need to apply on the grid rather than within the generating unit. Active filters can be applied within each generating unit, which uses a measure of current flowing via the grid connection and acts to absorb the distortion component via feedback control. However, in such instances, the rating of the active filter is forced to be larger than needed since it must compensate for currents produced by external background sources in addition to those created by the wind turbine power system. As such, active filters can create the potential for closed-loop instability.

To address the aforementioned issues, the present disclosure is directed to a system and method that is insensitive to distortion that is caused by external sources, does not require external equipment, and significantly reduces the distortion created from within the wind turbine power system.

More particularly, the system and method of the present disclosure creates trim signals that compensate for the voltage distortion introduced by the converter nonlinearities of the wind turbine power system.

BRIEF DESCRIPTION

Aspects and advantages of the invention will be set forth in part in the following description, or may be obvious from the description, or may be learned through practice of the invention.

In one aspect, the present disclosure is directed to a method for operating a inverter-based resource connected to a power grid. The method includes receiving one or more voltage feedback signals created by at least one component of the inverter-based resource, wherein distortion components of the one or more voltage feedback signals are more sensitive to voltage distortion created by the inverter-based resource than by external sources of voltage distortion. Further, the method includes extracting a distortion component of the one or more feedback signals having a certain phase sequence and frequency. Moreover, the method includes determining a voltage command for the power converter as a function of, at least, the distortion component. Thus, the method includes controlling the power converter based on the voltage command such that the voltage distortion created by the at least one component of the inverter-based resource is reduced in a manner that is relatively insensitive to voltage distortion created by sources external to the inverter-based resource.

In an embodiment, the inverter-based resource may be a dual-fed asynchronous generator (DFAG). In another embodiment, the component(s) of the inverter-based resource may be a rotor-side converter or a line-side converter of the DFAG.

In further embodiments, the inverter-based resource may be a full-conversion wind generating system, a solar generation system, or an energy storage power system.

In additional embodiments, extracting the distortion component of the one or more voltage feedback signals may include, for example, determining an angle representing the time-varying angular position of a specific frequency and phase sequence associated with the distortion component, rotating the one or more voltage feedback signals from a first reference frame by the angle to obtain a signal wherein a steady component of the signal represents vector components of the distortion component, filtering the rotated signal to attenuate components unrelated to the distortion component to isolate the distortion component, regulating, via a regulator, the rotated signal with a gain that sets a bandwidth thereof, and then rotating an output from the regulator back to the first reference frame to obtain the voltage command.

In another embodiment, the regulator may include nonwindup control having phase-preserving limit logic that maintains proportionality of the output signals. In particular embodiments, the component(s) of the inverter-based resource may be the rotor-side converter, with the phase-preserving limit logic of the rotor-side converter being based on rotor speed.

In still further embodiments, the method may include determining the voltage command for the power converter as a function of, at least, the distortion component for multiple control paths.

In additional embodiments, determining the voltage command for the power converter as a function of, at least, the distortion reduction signal may include adding the voltage commands from the multiple control paths together to obtain a trim signal.

In certain embodiments, determining the voltage command for the power converter as a function of, at least, the distortion reduction signal may include rotating the trim signal to a reference frame to combine with other control signals to obtain the voltage command.

In another aspect, the present disclosure is directed to a dual-fed asynchronous generator (DFAG) power system connected to a power grid. The DFAG power system includes a DFAG having a rotor and a stator, a power converter, a controller for controlling the DFAG power system. The controller is configured to perform a plurality of operations, including but not limited to receiving one or more voltage feedback signals created by at least one component of the DFAG power system, wherein distortion components of the one or more voltage feedback signals are more sensitive to voltage distortion created by the DFAG power system than by external sources of voltage distortion, extracting a distortion component of the one or more voltage feedback signals having a certain phase sequence and frequency, determining a voltage command for the power converter as a function of, at least, the distortion component, and controlling the power converter based on the voltage command such that the voltage distortion created by the at least one component of the DFAG is reduced in a manner that is relatively insensitive to voltage distortion created by sources external to the DFAG. It should also be understood that the DFAG power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates one embodiment of an example inverter-based resource according to the present disclosure, particularly illustrating a DFAG wind turbine power system;

FIG. 2 illustrates a block diagram of one embodiment of a controller suitable for use with the inverter-based resource shown in FIG. 1;

FIG. 3 illustrates a simplified schematic diagram of one embodiment of inverter-based resource according to the present disclosure, particularly illustrating a linearizing trim function of the system;

FIG. 4 illustrates a flow diagram of an embodiment of a method for operating a inverter-based resource connected to a power grid according to the present disclosure;

FIG. 5 illustrates a detailed, schematic diagram of one embodiment of a linearizing trim function for reducing voltage distortion of a particular character in a inverter-based resource according to the present disclosure;

FIG. 6 illustrates a detailed, schematic diagram of the linearizing trim function for simultaneously reducing multiple components of voltage distortion in a inverter-based resource of FIG. 5;

FIG. 7 illustrates a detailed, schematic diagram of one embodiment of a linearizing trim function for reducing voltage distortion of a particular character in a inverter-based resource according to the present disclosure;

FIG. 8 illustrates a detailed, schematic diagram of the linearizing trim function for simultaneously reducing multiple components of voltage distortion in a inverter-based resource of FIG. 7;

FIG. 9 illustrates a graph of one embodiment of the logistic function output (y-axis) versus rotor speed (x-axis) according to the present disclosure;

FIG. 10 illustrates a graph of one embodiment of a Fast Fourier transform (FFT) of phase A current at a high-voltage winding of a transformer of a inverter-based resource without the linearizing trim function of the present disclosure; and FIG. 11 illustrates a graph of one embodiment of a FFT of phase A current at a high-voltage winding of a transformer of a inverter-based resource with the linearizing trim function of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the primary sources of voltage distortion in inverter-based resources typically include the fifth and seventh harmonics of the fundamental frequency of the converter AC output. In a DFAG wind power system, such distortion exists on both the line-side converter and rotor-side converter. As such, the present disclosure is directed to a controller that implements a trim function to sufficiently reduce the distortion components contributed by the DFAG to the grid. In particular, the present disclosure uses the line AC voltage feedback to provide improved harmonic reduction for the line-side converter. The same structure may also be used on the rotor converter, but using rotor converter voltage with appropriate modification to account for the rotor electrical frequency.

In addition to DFAG wind power systems, there exists other energy conversion systems that connect to the electric power grid. Such systems are generally referred to as inverter-based resources. Examples of such resources include full-converter wind generators, solar energy converters, and energy storage systems. These latter examples all experience problems with voltage distortion similar to the DFAG wind turbines, although with less complexity than the DFAG wind turbine. The solutions explained herein for the DFAG wind turbine thereby cover the most complex application but are applicable as well to the simpler conversion systems.

Referring now to the drawings, FIG. 1 illustrates an inverter-based resource 100 according to one embodiment of the present disclosure. In particular, as shown, the inverter-based resource 100 is a wind driven dual-fed asynchronous generator (DFAG) system 100 according to one embodiment of the present disclosure. Example aspects of the present disclosure are discussed with reference to the DFAG wind turbine 10 of FIG. 1 for purposes of illustration and discussion. Those of ordinary skill in the art, using the disclosures provided herein, should understand that example aspects of the present disclosure are also applicable in other inverter-based resources.

In the example system 100, a rotor 106 includes a plurality of rotor blades 108 coupled to a rotatable hub 110, and together define a propeller that rotates at a rotor speed $\omega_R$ and at angle $\theta_P$. The propeller is coupled to an optional gearbox 118, which is, in turn, coupled to a generator 120 having a rotor 122 and a stator 124. In accordance with aspects of the present disclosure, the generator 120 may be any suitable generator, including for example, a dual-fed asynchronous generator (DFAG). The generator 120 is typically coupled to a stator bus 154 and a power converter 162 via a rotor bus 156. The stator bus 154 provides an output multiphase power (e.g. three-phase power) as well as stator current Is from the stator 122 of the generator 120 and the rotor bus 156 provides an output multiphase power (e.g. three-phase power) of a rotor of the generator 120 as well as stator current Is.

The power converter 162 includes a rotor-side converter 166 coupled to a line-side converter 168. The DFAG 120 is coupled to the rotor-side converter 166 via the rotor bus 156. The line-side converter 168 is coupled to a line-side bus 188. Further, as shown, the stator bus 154 may be directly connected to the line-side bus 188 and may include a line inductor 155 that is associated with a voltage VL and a current IL. In addition, as shown, a distortion filter 157 may be coupled in series to the line-side bus 188. In example configurations, the rotor-side converter 166 and the line-side converter 168 are configured for normal operating mode in a three-phase, PWM arrangement using insulated gate bipolar transistor (IGBT) switching elements, which are discussed in more detail herein. The rotor-side converter 166 and the line-side converter 168 can be coupled via a DC link 136 across which is the DC link capacitor 138. Further, as shown, the voltage across the DC link 136 is referred to as VDC. In alternative embodiments, the stator bus 154 and the power converter 162 may be connected to separate isolated windings of a transformer (not shown), i.e. at the junction of the generator breaker 158 and the converter breaker 186.

The power converter 162 can be coupled to a controller 174 to control the operation of the rotor-side converter 166 and the line-side converter 168 and other aspects of the power system 100. For example, as shown particularly in FIG. 2, the controller 174 can include any number of control devices. In one implementation, for example, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power converter 162 and other aspects of the power system 100.

Additionally, the controller 174 may also include a communications module 180 to facilitate communications between the controller 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

In operation, alternating current power generated at the DFAG 120 by rotation of the rotor 106 is provided via a dual path to a grid bus 160 and ultimately to a power grid 164. Further, as shown, the grid bus 160 may provide a voltage $V_T$, a current $I_T$, power $P_T$, and/or a reactive power $Q_T$ to the grid 164. The dual paths are defined by a generator power path 130 and a converter power path 132. On the converter power path 132, sinusoidal multi-phase (e.g. three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the power grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFAG 120 to provide multi-phase power (e.g. three-phase power) having a frequency maintained substantially at the frequency of the power grid 160 (e.g. 50 Hz/60 Hz). Further, as shown, the associated electrical power can be transmitted to a main transformer 142 that is typically connected to the power grid 160. Thus, the main transformer 142 steps up the voltage amplitude of the electrical power such that the transformed electrical power may be further transmitted to the power grid 160.

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the controller 174. The control signals can be based, among other things, on sensed conditions or operating characteristics of the wind turbine system 100. Typically, the control signals provide for control of the operation of the power converter 162. For example, feedback in the form of sensed speed of the DFAG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Referring now to FIG. 3, a simplified schematic diagram of one embodiment of a DFAG power system 200 according to the present disclosure is illustrated. As shown, the diagram illustrates a closed loop control system that sets forth the characteristics of the system that are to be controlled. More specifically, as shown, the control loop includes a main circuit 202, main regulators 204 (such as torque, flux, voltage, synchronization, etc.), a linearizing trim function 350, 450 for the line-side and rotor-side converters 166, 168, and a pulse width modulation (PWM) logic 210, 212 for the line-side and rotor-side converters 166, 168. The main circuit 202, as described herein, generally includes the converters 166, 168, the DC link 136, various filters, the generator 120, the transformer 142, the external grid 164, and any external distortion. Thus, the main circuit 202 provides various signals (e.g. voltage, current, torque, speed, etc.) to the main regulators 204. Synchronization signals from the main regulators 204, along with the various feedback signals from the main circuit 202 and voltage commands from the linearizing trim function 350, 450 are sent to the PWM logic 210, 212 for each of the line-side and rotor-side converters 166, 168, respectively. Operation of the linearizing trim functions 350, 450 are described more specifically herein with respect to FIGS. 4-11. The PWM logic 210, 212 then generates gate pulse commands (e.g. the gate pulses illustrated in FIG. 1) for the converters 166, 168, respectively. Each signal path indicated in FIG. 3 may represent a plurality of individual signals, e.g. measured voltages are a three-phase set, commands to the PWM logic and output of the linearizing trim functions each typically contain two individual signals.

Accordingly, as shown in FIGS. 4-8, systems and methods for reducing such voltage distortion contributed to the power grid by the inverter-based resource 100 are illustrated. More specifically, as mentioned, the linearizing trim function 350 is provided to reduce such voltage distortion. Referring particularly to FIG. 4, a simplified flow diagram of one embodiment of a method 250 for operating a power system connected to a power grid so as to reduce voltage distortion generated thereby according to the present disclosure is illustrated. In general, the method 250 described herein generally applies to operating the DFAG wind turbine power systems 100, 200 described above with respect to FIGS. 1-3 and the systems 300, 400 of FIGS. 5-8. However, it should be appreciated that the disclosed method 250 may be implemented using any other suitable power system that is configured to supply power for application to a load, such as a power grid, such as a solar power system, a hydropower system, an energy storage power system, or combinations thereof. Further, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (252), the method 250 may include receiving one or more feedback signals that include voltage distortion created by at least one component of the inverter-based resource 100, wherein voltage is more sensitive to the voltage distortion created by the inverter-based resource 100 than by external sources of voltage distortion inverter-based resource 100. As shown at (254), the method 250 may include extracting a distortion component of the feedback signal(s) having a certain phase sequence and frequency. As used herein, a distortion component generally refers to any component of the three-phase AC signal that is different from the positive-sequence, fundamental-frequency component. Therefore, there may be multiple distortion components present in the signal and each can be characterized by a frequency and phase sequence, i.e. either positive-sequence or negative-sequence or zero-sequence.

As shown at (256), the method 250 may include determining a voltage command for the power converter as a function of, at least, the distortion component. As shown at (258), the method 250 may include controlling the power converter based on the voltage command such that the voltage distortion created by the component(s) of the inverter-based resource 100 is reduced in a manner that is relatively insensitive to voltage distortion created by sources external to the inverter-based resource 100.

Thus, the simplified method 250 of FIG. 4 can be better understand with the system 300 illustrated in FIG. 5. In particular, in an embodiment, as shown in FIGS. 5 and 6, the input voltage feedback signals 302 received by the system 300 may be alternating current (AC) voltage feedback signals from one or more sensors, and its output may be the change in voltage commands to eliminate the desired harmonic(s), which is discussed in more detail herein.

More particularly, as described herein, the voltage feedback signals (e.g. VFbk_abc) contain components due to the fundamental frequency and components due to harmonics. In one embodiment, for example, the three-phase voltage feedback signals may be represented as follows:

$$V_a = V_1 \cos(\omega_1 t + \phi_1) + V_h \cos(\omega_h t + \phi_h) + \sum V_n \cos(\omega_n t + \phi_n)$$

$$V_b = V_1 \cos\left(\omega_1 t + \phi_1 - \frac{2\pi}{3}\right) +$$
$$V_h \cos\left(\omega_h t + \phi_h - m_h \frac{2\pi}{3}\right) + \sum V_n \cos\left(\omega_n t + \phi_n - m_n \frac{2\pi}{3}\right)$$

$$V_c = V_1 \cos\left(\omega_1 t + \phi_1 + \frac{2\pi}{3}\right) + V_h \cos\left(\omega_h t + \phi_h + m_h \frac{2\pi}{3}\right) +$$
$$\sum V_n \cos\left(\omega_n t + \phi_n - m_n \frac{2\pi}{3}\right)$$

Where $V_a$, $V_b$, and $V_c$ are the voltage feedback signals, $V_1$ is the line-ground peak amplitude of the fundamental feedback voltage,
$\omega_1$ is the fundamental frequency in radians/second (rad/s), and
$\phi_1$ is the initial phase angle of the fundamental in radians.

In addition, the specific component of the harmonic distortion to be controlled is denoted with subscript h, where Vh is the line-ground peak amplitude of the harmonic feedback voltage,
$\omega h$ is the harmonic frequency in rad/s,
$\phi h$ is the initial phase angle of the harmonic in radians, and mh is an integer to represent phase sequence of the harmonic (+1 for positive sequence and −1 for negative sequence). In such embodiments, Vn, $\omega$n, $\phi$n, mn are the voltage amplitude, frequency, phase and sequence of every other harmonic present in the voltage feedback signal(s) except for the one that is to be controlled.

Thus, as shown at 302 in FIG. 5, the system 300 receives voltage signal $V_{abc}$ and rotates the signal by a multiple of the phase-locked loop angle $\theta_{pll}$ 315. In such embodiments, the PLL angle 315 may be identical to the angle of the fundamental frequency voltage as represented below:

$$\theta_{pll} = \omega_1 t + \phi_1$$

In particular embodiments, the angle of the harmonic voltage may be needed to transform the voltage feedback signal(s) to a reference frame where the harmonic of interest can be separated from the fundamental frequency and other harmonics. As such, the system 300 can assume that the harmonic angle can be obtained by multiplying the PLL angle by a factor N (e.g. 317) as represented below:

$$\theta_h = N \theta_{pll} = \frac{\omega_h}{\omega_2} \theta_{pll}$$

While the method is valid for any value of N, common usage would be for N to be an integer. The polarity of factor N 317 is indicative of the phase sequence to be reduced.

The multiplied PLL angle can then be used to rotate the raw feedback voltages to the harmonic reference frame using the following equations:

$$V_{xh} = \frac{2}{3}\left[V_a \cos(N\theta_{pll}) + V_b \cos\left(N\theta_{pll} - \frac{2\pi}{3}\right) + V_c \cos\left(N\theta_{pll} + \frac{2\pi}{3}\right)\right]$$

-continued $$V_{yh} = \frac{2}{3}\left[V_a \sin(N\theta_{pll}) + V_b \sin\left(N\theta_{pll} - \frac{2\pi}{3}\right) + V_c \sin\left(N\theta_{pll} + \frac{2\pi}{3}\right)\right],$$

where Vxh and Vyh represent the voltages in the harmonic rotating frame. Furthermore, in an embodiment, the x, y voltages can also be expressed as follows:

$$V_{xh} = V_h \cos(\phi_h - N\phi_1) + V_1 \cos([1-N]\theta_{pll}) + \Sigma V_n \cos(\omega_n t + \phi_n - N\theta_{pll})$$

$$V_{yh} = V_h \sin(\phi_h - N\phi_1) + V_1 \sin([1-N]\theta_{pll}) + \Sigma V_n \sin(\omega_n t + \phi_n - N\theta_{pll})$$

The signals Vxh, Vyh have a steady component, such as a steady DC component, proportional to the magnitude of the voltage Vh plus several components which alternate in time (AC). These alternating components may be filtered by means known in the art to create a filtered version of Vxh, Vyh which contains predominantly of the DC component:

$$V_{xhf} = V_h \cos(\phi_h - N\phi_1)$$

$$V_{yhf} = V_h \sin(\phi_h - N\phi_1)$$

where Vxhf and Vyhf represent the filtered harmonic voltages in the harmonic rotating frame. These represent the harmonic voltage of interest in phasor form as represented below:

$$Vhf = Vxhf + jVyhf$$

Referring still to FIG. 5, the above process is represented by the steps leading up to creation of Vxhf and Vyhf (as shown at 310) from the feedback voltage signal(s) 302 and the harmonic angle 304. In particular, the rotation function 306 converts the AC input to the rotating harmonic reference frame using the harmonic angle 304. In certain embodiments, the filtering function 308 may be a low-pass type filter that isolates the DC component. Those skilled in art will understand that the filter 308 may take several forms, including various low-pass and/or notch filters, selected according to the particular application. Note that the feedback voltage 302 includes three phases, while the result of the rotation 306 and subsequent signals include two independent components denoted above by xh and yh.

Referring still to FIG. 5, the system 300 may also include a regulator 312. Such regulator 312, may be, as an example, of an integral type. Accordingly, in an embodiment, the regulator 312 is configured to create an output signal 314 (VxhReg and VyhReg) that, with additional steps as described subsequently, acts to reduce the amplitude of the measured harmonic phasor Vhf. Furthermore, in particular embodiments, the regulator 312 may be of several types, e.g. proportional-integral, or integral with droop, or other forms as is well known in the art. The integral type is shown here for clarity of describing the limiting functions and is not meant to be limiting.

In additional embodiments, the regulator 312 may include a phase-preserving limit logic 316. In such embodiments, the logic constrains the amplitude of the regulator output 314 to a predetermined limit while preserving the ratio of the x and y components and preventing windup. In such embodiments, the system 300 may also determine a factor that is used as a multiplier in appropriate locations. More specifically, in an embodiment, the factor may be defined as follows:

LimFactor=min(1.0,Vlim/abs(VhReg_Unlim))

Where abs(VhReg_Unhm))=sqrt(VxhReg_Unlim$^2$+Vyh-Reg_Unlim$^2$),

"Unlim" versions are the initial result of the integration step, and

Vlim is the maximum value of the amplitude.

In certain embodiments, this factor may be equal to unity unless the magnitude of VhReg_Unlim exceeds the limit Vlim, and less than unity otherwise. Moreover, the factor may be used as follows:

$$VxhReg = VxhReg\_Unlim * LimFactor$$

$$VyhReg = VyhReg\_Unlim * LimFactor$$

In such embodiments, the new values of VxhReg and VyhReg become signal 314 for the next steps in the process, and also the values to be used to integrate from on the next pass through the control algorithms. Accordingly, the process prevents windup while preserving the phase.

Still referring to FIG. 5, another step includes rotating the regulator outputs to the same reference frame as used for the other control functions. For example, as shown, such rotation is represented by element 318, with output 324 VhTrim representing the output of the trim regulator for an example where the output 324 is in the same abc reference frame as the feedback voltage 302. For this example, the rotation angle uses the harmonic angle 304 with a negative sign. In further embodiments, as shown, the rotation may also include a compensation phase angle 322. Thus, the compensation angle 322 may be predetermined to account for latencies in the overall system 300.

The above process may be performed for several different values of N to obtain trim signals for each. Thus, as shown in FIG. 6, such trim signals can be added to create a total trim function VTrim 326. It will be understood that the final trim signal may need to be in a different reference frame to combine with other control signals to the converter as shown in FIG. 3. This additional rotation is included as element 328 in FIG. 6. The reference for this final rotation can be the same as comparable reference frame rotations used in other portions of the overall control. The resulting final trim signal 330 is then combined with other converter commands as shown in FIG. 3.

Still referring to FIG. 6, the illustrated system 350 can be used for the line converter 168 of a DFAG wind turbine. In such embodiments, the input 302 may be the line converter voltage 159 (FIG. 1). Alternatively, the transformer low-side voltage 188 may provide a suitable feedback signal in applications where voltage 188 is more sensitive to line converter voltage 159 than external sources of distortion. Moreover, it should be understood that the trim function described herein may also be used for other inverter-based resources such as solar energy systems, energy storage, or other types of wind generators.

It should be understood that the previous methods described thus far generally refer to undesired harmonics applied to the line-side converter 168, however, the proposed methods of the present disclosure can also be applied to the rotor-side converter 166 as well or both. For example, the previously-described approaches can be applied to the rotor-side converter 166 if the angle used for the transformations is adjusted by the rotor feedback angle. In such embodiments, and as further explained in reference to FIG. 7, the rotor feedback voltages 402 (e.g. VRFbk_abc) can be represented as:

$$V_{ra} = V_{r1}\cos(\omega_{r1}t + \phi_{r1}) + V_h\cos(\omega_h t + \phi_h) + \sum V_n\cos(\omega_n t + \phi_n)$$

$$V_{rb} = V_{r1}\cos\left(\omega_{r1}t + \phi_{r1} - \frac{2\pi}{3}\right) +$$
$$V_h\cos\left(\omega_h t + \phi_h - m_h\frac{2\pi}{3}\right) + \sum V_n\cos\left(\omega_n t + \phi_n - m_n\frac{2\pi}{3}\right)$$

$$V_{rc} = V_{r1}\cos\left(\omega_{r1}t + \phi_{r1} + \frac{2\pi}{3}\right) + V_h\cos\left(\omega_h t + \phi_h + m_h\frac{2\pi}{3}\right) +$$
$$\sum V_n\cos\left(\omega_n t + \phi_n - m_n\frac{2\pi}{3}\right).$$

where $V_{ra}$, $V_{rb}$, $V_{rc}$ represent the rotor feedback voltages,
$V_{r1}$ is the amplitude of the rotor feedback,
$\phi_{r1}$ is the initial phase angle of the rotor fundamental, and
$\omega_{r1}$ is the rotor frequency in rad/s.

The specific component of the harmonic distortion to be controlled is denoted with subscript h, where Vh is the line-ground peak amplitude of the harmonic feedback voltage, ωh is the harmonic frequency in rad/s, φh is the initial phase angle of the harmonic in radians and mn is an integer to represent phase sequence of the harmonic (+1 for positive sequence and −1 for negative sequence). Vn, ωn, φn, mn are the voltage amplitude, frequency, phase and sequence of every other harmonic present in the feedback voltage except for the one that is to be controlled.

As mentioned in previous embodiments, a PLL can be used to obtain the electrical angle at the stator winding terminals and the angle of the rotor shaft is measured using a tachometer or similar device. The rotor voltages are aligned to a rotating reference frame defined by the following expression:

$$\theta_r = \theta_{pll} - \theta_m$$

where the θr is the angle of the rotor reference frame,
θpll is the PLL angle locked to the stator voltage, and
θm is the electrical angle corresponding to the measured mechanical angle of the rotor with respect to the stator.

Referring still to FIG. 7, a schematic diagram of system 400, similar to FIG. 5, but instead applied to the rotor-side converter 166 is illustrated. As shown, the structure is identical to system 300 with exception of the signal 404 used for rotation and the use of rotor speed to adjust the limit on the regulator 412. Further, as shown, the system 400 also includes a rotation function 406 that converts the AC input to the rotating harmonic reference frame using the harmonic angle 404, which may be determined using phase-locked loop angle 415 and factor N 417. In certain embodiments, the filtering function 408 may be a low-pass type filter that isolates the DC component. Moreover, as shown, the system 400 may also include a regulator 412 configured to create an output signal 414 (VRxhReg and VRyhReg). Furthermore, as shown at 418, the system 400 includes rotating the regulator outputs to the same reference frame with output 424 VRhTrim_abc representing the output of the trim regulator for an example where the output 424 is in the same abc reference frame as the feedback voltage 402. In further embodiments, as shown, the rotation may also include a compensation phase angle 422. Thus, the compensation angle 222 may be predetermined to account for latencies in the overall system 400. The above process may be performed for several different values of factor N 417 to obtain trim signals for each. Thus, as shown in the system 450 of FIG. 8, such trim signals can be added to create a total trim function VTrim 426. It will be understood that the final trim signal may need to be in a different reference frame to combine with other control signals to the converter as shown in FIG. 3. This additional rotation is included as element 428 in FIG. 7. The reference for this final rotation can be the same as comparable reference frame rotations used in other portions of the overall control. The resulting final trim signal 430 is then combined with other converter commands as shown in FIG. 3.

Phase preserving limits applied to the rotor-side converter 166 can be made speed-dependent to restrict the operation of the harmonic trimmer only to certain speeds of the DFAG 120. In particular, as shown in FIG. 9, disabling the harmonic trimmer around synchronous speed operating condition prevents the harmonic trimmer from interfering with the positive-sequence fundamental regulation functions (e.g. due to zero frequency in the rotor electrical circuit around synchronous speed). For example, FIG. 9 illustrates how this limit may be scaled based on rotor speed. In such embodiments, the speed dependency can be implemented by scaling the limits based on a logistic function, thereby smoothly transitioning between a minimum value of zero and a maximum value of 1. An example function for this speed-dependent limit is represented by the following equation, but many other forms can be used to create a suitable shape:

$$f(\omega) = \frac{1}{1 + e^{-k(\omega - \omega 0)}}$$

where k represents a steepness factor of the curve,
w is the rotor speed feedback, and
ω0 is the rotor speed corresponding to the transition midpoint of the logistic function.

In such embodiments, the elements k and (DO can be selected to have the desired speed range for which the rotor harmonic trimmer can operate. Thus, this speed dependent factor f(ω) can be used to scale the limit of the harmonic trimmer function on the rotor-side converter 166 to effectively disable the harmonic trimmer in certain speed ranges that correspond to a scale factor close output close to 0.

Referring now to FIGS. 10 and 11, comparative frequency graphs are provided to illustrate the distortion at the high-voltage winding of the transformer 142. More particularly, FIG. 10 illustrates the case without the harmonic trimmer, in which the 5th and 7th harmonic (250 Hz and 350 Hz) components are clearly depicted. In contrast, as shown in FIG. 11, with the harmonic trimmer feature applied, these components are negligibly small.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

Further aspects of the invention are provided by the subject matter of the following clauses:

Clause 1. A method for operating an inverter-based resource connected to a power grid, the method comprising:
receiving one or more voltage feedback signals created by at least one component of the inverter-based resource, wherein distortion components of the one or more voltage feedback signals are more sensitive to voltage distortion created by the inverter-based resource than by external sources of voltage distortion;
extracting a distortion component of the one or more feedback signals having a certain phase sequence and frequency;
determining a voltage command for the power converter as a function of, at least, the distortion component; and,
controlling the power converter based on the voltage command such that the voltage distortion created by the at least one component of the inverter-based resource is reduced in a manner that is relatively insensitive to voltage distortion created by sources external to the inverter-based resource.

Clause 2. The method of clause 1, wherein the inverter-based resource comprises a dual-fed asynchronous generator (DFAG).

Clause 3. The method of clause 2, wherein the at least one component of the inverter-based resource comprises at least one of a rotor-side converter or a line-side converter of the DFAG.

Clause 4. The method of any of the preceding clauses, wherein the inverter-based resource comprises at least one of a full-conversion wind generating system, a solar generation system, or an energy storage power system.

Clause 5. The method of any of the preceding clauses, wherein extracting the distortion component of the one or more voltage feedback signals further comprises:
determining an angle representing the time-varying angular position of a specific frequency and phase sequence associated with the distortion component;
rotating the one or more voltage feedback signals from a first reference frame by the angle to obtain a signal wherein a steady component of the signal represents vector components of the distortion component.

Clause 6. The method of any of the preceding clauses, wherein extracting the distortion component of the one or more voltage feedback signals further comprises:
filtering the rotated signal to attenuate components unrelated to the distortion component to isolate the distortion component.

Clause 7. The method of any of the preceding clauses, wherein extracting the distortion component of the one or more voltage feedback signals further comprises:
regulating, via a regulator, the rotated signal with a gain that sets a bandwidth thereof; and
rotating an output from the regulator back to the first reference frame to obtain the voltage command.

Clause 8. The method of any of the preceding clauses, wherein the regulator further comprises non-windup control comprising phase-preserving limit logic that maintains proportionality of the output signals.

Clause 9. The method of any of the preceding clauses, wherein the at least one component of the inverter-based resource comprises a rotor-side converter, the phase-preserving limit logic of the rotor-side converter is based on rotor speed.

Clause 10. The method of any of the preceding clauses, further comprising determining the voltage command for the power converter as a function of, at least, the distortion component for multiple control paths.

Clause 11. The method of any of the preceding clauses, wherein determining the voltage command for the power converter as a function of, at least, the distortion reduction signal further comprises:
adding the voltage commands from the multiple control paths together to obtain a trim signal.

Clause 12. The method of any of the preceding clauses, wherein determining the voltage command for the power converter as a function of, at least, the distortion reduction signal further comprises:
rotating the trim signal to a reference frame to combine with other control signals to obtain the voltage command.

Clause 13. A dual-fed asynchronous generator (DFAG) power system connected to a power grid, the DFAG power system comprising:
a DFAG comprising a rotor and a stator;
a power converter; and,
a controller for controlling the DFAG power system, the controller configured to perform a plurality of operations, the plurality of operations comprising:
receiving one or more voltage feedback signals created by at least one component of the DFAG power system, wherein distortion components of the one or more voltage feedback signals are more sensitive to voltage distortion created by the DFAG power system than by external sources of voltage distortion;
extracting a distortion component of the one or more voltage feedback signals having a certain phase sequence and frequency;
determining a voltage command for the power converter as a function of, at least, the distortion component; and,
controlling the power converter based on the voltage command such that the voltage distortion created by the at least one component of the DFAG is reduced in a manner that is relatively insensitive to voltage distortion created by sources external to the DFAG.

Clause 14. The DFAG power system of clause 13, wherein the at least one component of the DFAG power system comprises at least one or the rotor-side converter or the line-side converter.

Clause 15. The DFAG power system of clauses 13 and 14, wherein extracting the distortion component of the one or more voltage feedback signals further comprises:
determining an angle representing the time-varying angular position of a specific frequency and phase sequence associated with the distortion component;
rotating the one or more voltage feedback signals from a first reference frame by the angle to obtain a signal wherein a steady component of the signal represents vector components of the distortion component; and
filtering the rotated signal to attenuate components unrelated to the distortion component to isolate the distortion component.

Clause 16. The DFAG power system of clauses 13-15, wherein extracting the distortion component of the one or more feedback signals further comprises:
regulating, via a regulator, the rotated signal with a gain that sets a bandwidth thereof; and
rotating an output from the regulator back to the first reference frame to obtain the voltage command.

Clause 17. The DFAG power system of clauses 13-16, wherein the regulator further comprises non-windup control comprising phase-preserving limit logic that maintains proportionality of the output signals.

Clause 18. The DFAG power system of clauses 13-17, further comprising determining the voltage command for the power converter as a function of, at least, the distortion component for multiple control paths.

Clause 19. The DFAG power system of clauses 13-18, wherein determining the voltage command for the power converter as a function of, at least, the distortion reduction signal further comprises:
adding the voltage commands from the multiple control paths together to obtain a trim signal.

Clause 20. The DFAG power system of clauses 13-19, wherein determining the voltage command for the power converter as a function of, at least, the distortion reduction signal further comprises:
rotating the trim signal to a reference frame to combine with other control signals to obtain the voltage command.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an inverter-based resource connected to a power grid, the method comprising:
receiving one or more voltage feedback signals created by at least one component of the inverter-based resource;
extracting a distortion component of the one or more feedback signals having a certain phase sequence and frequency by:
determining an angle representing a time-varying angular position of the certain phase sequence and frequency associated with the distortion component; and
rotating the one or more voltage feedback signals from a first reference frame by the angle to obtain a signal, wherein a steady component of the signal represents one or more vector components of the distortion component;
wherein the distortion component comprises any component of the one or more voltage feedback signals that is different from a positive-sequence, fundamental-frequency component of the one or more voltage feedback signals;
determining a voltage command for the power converter as a function of, at least, the distortion component; and,
controlling the power converter based on the voltage command such that voltage distortion created by the at least one component of the inverter-based resource is reduced in a manner that is relatively insensitive to voltage distortion created by sources external to the inverter-based resource.

2. The method of claim 1, wherein the inverter-based resource comprises a dual-fed asynchronous generator (DFAG).

3. The method of claim 2, wherein the at least one component of the inverter-based resource comprises at least one of a rotor-side converter or a line-side converter of the DFAG.

4. The method of claim 1, wherein the inverter-based resource comprises at least one of a full-conversion wind generating system, a solar generation system, or an energy storage power system.

5. The method of claim 1, wherein extracting the distortion component of the one or more voltage feedback signals further comprises:
filtering the rotated signal to attenuate components unrelated to the distortion component to isolate the distortion component.

6. The method of claim 5, wherein extracting the distortion component of the one or more voltage feedback signals further comprises:
regulating, via a regulator, the rotated signal with a gain that sets a bandwidth thereof; and
rotating an output from the regulator back to the first reference frame to obtain the voltage command.

7. The method of claim 6, wherein the regulator further comprises non-windup control comprising phase-preserving limit logic that maintains proportionality of the output signals.

8. The method of claim 7, wherein the at least one component of the inverter-based resource comprises a rotor-side converter, the phase-preserving limit logic of the rotor-side converter is based on rotor speed.

9. The method of claim 6, further comprising determining the voltage command for the power converter as a function of, at least, the distortion component for multiple control paths.

10. The method of claim 9, wherein determining the voltage command for the power converter as a function of, at least, the distortion reduction signal further comprises:
adding the voltage commands from the multiple control paths together to obtain a trim signal.

11. The method of claim 10, wherein determining the voltage command for the power converter as a function of, at least, the distortion reduction signal further comprises:
rotating the trim signal to a reference frame to combine with other control signals to obtain the voltage command.

12. A power system connected to a power grid, the power system comprising:
a dual-fed asynchronous generator (DFAG) comprising a rotor and a stator;
a power converter; and,
a controller for controlling the power system, the controller configured to perform a plurality of operations, the plurality of operations comprising:
receiving one or more voltage feedback signals created by at least one component of the power system;
extracting a distortion component of the one or more voltage feedback signals having a certain phase sequence and frequency by:
determining an angle representing a time-varying angular position of the certain phase sequence and frequency associated with the distortion component; and
rotating the one or more voltage feedback signals from a first reference frame by the angle to obtain a signal wherein a steady component of the signal represents vector components of the distortion component;
wherein the distortion component comprises any component of the one or more voltage feedback signals that is different from a positive-sequence, fundamental-frequency component of the one or more voltage feedback signals;
determining a voltage command for the power converter as a function of, at least, the distortion component; and,
controlling the power converter based on the voltage command such that voltage distortion created by the at least one component of the DFAG is reduced in a manner that is relatively insensitive to voltage distortion created by sources external to the DFAG.

13. The power system of claim 12, wherein the at least one component of the DFAG power system comprises at least one or the rotor-side converter or the line-side converter.

14. The power system of claim 12, wherein extracting the distortion component of the one or more voltage feedback signals further comprises
filtering the rotated signal to attenuate components unrelated to the distortion component to isolate the distortion component.

15. The power system of claim 14, wherein extracting the distortion component of the one or more feedback signals further comprises:
regulating, via a regulator, the rotated signal with a gain that sets a bandwidth thereof; and
rotating an output from the regulator back to the first reference frame to obtain the voltage command.

16. The power system of claim 15, further comprising determining the voltage command for the power converter as a function of, at least, the distortion component for multiple control paths.

17. The power system of claim 15, wherein the regulator further comprises non-windup control comprising phase-preserving limit logic that maintains proportionality of the output signals.

18. The power system of claim 17, wherein determining the voltage command for the power converter as a function of, at least, the distortion reduction signal further comprises:
adding the voltage commands from the multiple control paths together to obtain a trim signal.

19. The power system of claim 18, wherein determining the voltage command for the power converter as a function of, at least, the distortion reduction signal further comprises:
rotating the trim signal to a reference frame to combine with other control signals to obtain the voltage command.

* * * * *